(12) United States Patent
Bentley (10) Patent No.: US 10,476,846 B2
(45) Date of Patent: Nov. 12, 2019

(54) DATA-AT-REST (DAR) ENCRYPTION FOR INTEGRATED STORAGE MEDIA

(71) Applicant: The Boeing Company, Chicago, IL (US)

(72) Inventor: Sean Franklin Bentley, Laguna Niguel, CA (US)

(73) Assignee: THE BOEING COMPANY, Chicago, IL (US)

( * ) Notice: Subject to any disclaimer, the term of this patent is extended or adjusted under 35 U.S.C. 154(b) by 299 days.

(21) Appl. No.: 15/230,185

(22) Filed: Aug. 5, 2016

(65) Prior Publication Data

US 2018/0041476 A1 Feb. 8, 2018

(51) Int. Cl.
| | |
|---|---|
| *H04L 29/06* | (2006.01) |
| *G06F 12/14* | (2006.01) |
| *G06F 21/62* | (2013.01) |
| *G06F 21/79* | (2013.01) |

(52) U.S. Cl.
CPC ...... *H04L 63/0281* (2013.01); *G06F 12/1408* (2013.01); *G06F 21/62* (2013.01); *G06F 21/6209* (2013.01); *G06F 21/6218* (2013.01); *G06F 21/79* (2013.01); *H04L 63/166* (2013.01); *G06F 2212/1052* (2013.01)

(58) Field of Classification Search
CPC ............... H04L 63/0281; H04L 63/166; G06F 12/1408; G05F 2212/1052
See application file for complete search history.

(56) References Cited

U.S. PATENT DOCUMENTS

| | | | |
|---|---|---|---|
| 5,958,051 A * | 9/1999 | Renaud ................... | G06F 21/64 726/22 |
| 9,305,142 B1 | 4/2016 | Ybarra et al. | |
| 2008/0065905 A1 | 3/2008 | Salessi | |
| 2008/0168243 A1* | 7/2008 | Bychkov ............ | G06F 11/1435 711/161 |
| 2011/0264951 A1* | 10/2011 | Pratt ................... | G06F 11/1417 714/6.32 |
| 2015/0371055 A1 | 12/2015 | Park et al. | |
| 2016/0232109 A1* | 8/2016 | Canter .................... | G06F 21/79 |
| 2016/0246737 A1* | 8/2016 | Vichodes ............ | G06F 12/1408 |

OTHER PUBLICATIONS

Extended European Search Report dated Sep. 20, 2017 for European Application No. 171663721.
"BitLocker Drive Encryption in Windows 7: Frequently Asked Questios", Microsoft, Mar. 22, 2012. https://technet.microsoft.com/en-us/library/ee449438(d=printer,v=ws.10).aspx.

* cited by examiner

*Primary Examiner* — Khalil Naghdali
(74) *Attorney, Agent, or Firm* — Gates & Cooper LLP (57) ABSTRACT

An improved system for providing transparent, in-line encryption of data-at-rest (DAR) stored by a host controller of a host device. An encryption core is instantiated in a hardware device physically coupled to a system board within the host device. The encryption core includes a storage device proxy, an encryption engine, and a plurality of host device proxies. Each host proxy among the plurality of host proxies interfaces the host controller to one persistent storage device among a plurality of persistent storage devices within the host device via the storage device proxy. The storage device proxy exposes the plurality of persistent storage devices to the host controller as a single persistent storage device. The encryption core encrypts and decrypts DAR exchanged between the host controller and an encrypted storage device.

20 Claims, 7 Drawing Sheets

DATA-AT-REST (DAR) ENCRYPTION FOR INTEGRATED STORAGE MEDIA

TECHNICAL FIELD

The present invention relates generally, but not exclusively, to systems and computing devices with integrated persistent storage media, and more particularly to a system for providing transparent, in-line encryption technology for Data-at-Rest (DAR) stored in integrated persistent storage.

BACKGROUND

Integrated storage media, such as embedded Multi-Media Card (eMMC) storage devices, are typically used to provide computing devices with integrated persistent memory for storing data. The computing devices often use such integrated storage media to store Data-at-Rest (DAR). DAR generally refers to data that is either not being processed by a computing device's host processor or not residing in the computing device's system memory. Existing approaches to encrypting DAR are typically out-of-band encryption techniques. For example, existing approaches to encrypting DAR may be implemented as separate services utilized by a computing device's host processor.

Such existing out-of-band encryption techniques may degrade a computing device's performance. For example, the host processor's availability to perform other work may be reduced while utilizing the separate service to encrypt DAR, thereby degrading the computing device's throughput and/or latency performance. Also, a communication path coupling the host processor and the separate service may be compromised, thereby reducing the encryption technique's effectiveness. Thus, a need exists for an improved method and system for encrypting DAR stored in integrated storage media.

SUMMARY

This Summary is provided to introduce a selection of concepts in a simplified form that are further described below in the Detailed Description. This Summary is not intended to identify key features or essential features of the claimed invention, nor is it intended to be used to limit the scope of the claimed invention.

The present invention discloses a hardware-based, in-line encryption technique for securely storing data-at-rest (DAR) without degrading a host device's performance, as discussed above with existing encryption techniques. For example, unlike out-of-band encryption techniques, a technical effect of the hardware-based encryption engine is transparently providing a host device with in-line DAR encryption, thereby freeing the host processor's to perform other work. By freeing the host processor to perform other work, the hardware-based encryption engine improves the host device's throughput and/or latency performance.

According to an aspect of the invention, a system is provided for providing transparent, in-line encryption of DAR stored by a host controller of a host device. The system instantiates an encryption core comprising a storage device proxy, an encryption engine, and a plurality of host device proxies. Each host proxy among the plurality of host proxies interfaces the host controller to one persistent storage device among a plurality of persistent storage devices via the storage device proxy. The plurality of persistent storage devices include an encrypted storage device providing memory to the host device for storing encrypted DAR and a recovery storage device providing memory storing unencrypted recovery data usable to repair system resources of the host device. The storage device proxy exposes the plurality of persistent storage devices to the host controller as a single persistent storage device. The system also receives a transfer command to initiate a data transfer operation from the host controller at the storage device proxy. The system processes the transfer command based on the data transfer operation initiated by the transfer command and an encryption state of the encryption engine.

According to another aspect of the invention, a method is provided for providing transparent, in-line encryption of data-at-rest (DAR) stored by a host controller of a host device. The method instantiates an encryption core comprising a storage device proxy, an encryption engine, and a plurality of host device proxies. Each host proxy among the plurality of host proxies interfaces the host controller to one persistent storage device among a plurality of persistent storage devices via the storage device proxy. The plurality of persistent storage devices include an encrypted storage device providing memory to the host device for storing encrypted DAR and a recovery storage device providing memory storing unencrypted recovery data usable to repair system resources of the host device. The storage device proxy exposes the plurality of persistent storage devices to the host controller as a single persistent storage device. The method also receives a write command to initiate a write operation from the host controller at the storage device proxy and determining an encryption state of the encryption engine. The write command is processed based on the encryption state of the encryption engine.

According to another aspect of the invention, a system is provided for providing transparent, in-line encryption of data-at-rest (DAR) stored by a host controller of a host device. The system instantiates an encryption core comprising a storage device proxy, an encryption engine, and a plurality of host device proxies. Each host proxy among the plurality of host proxies interfaces the host controller to one persistent storage device among a plurality of persistent storage devices via the storage device proxy. The plurality of persistent storage devices include an encrypted storage device providing memory to the host device for storing encrypted DAR and a recovery storage device providing memory storing unencrypted recovery data usable to repair system resources of the host device. The storage device proxy exposes the plurality of persistent storage devices to the host controller as a single persistent storage device. The system also receives a read command to initiate a read operation from the host controller at the storage device proxy. The system processes the read command based on an encryption state of the encryption engine.

Additional aspects of the inventive system are described below.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

The present disclosure describes particular embodiments in terms of detailed construction and operation to meet statutory requirements. Throughout the appended drawings, like elements are referenced using like references. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Various aspects of the technology described herein are generally directed to systems, methods, and computer-readable storage media for, among other things, providing transparent, in-line encryption of Data-at-Rest (DAR) stored by a host computing device (host device) in an embedded persistent storage device (embedded storage). As used herein, "in-line encryption" refers to encryption of data within a data path between a host controller of a host device and an embedded storage device within the host device. The in-line encryption techniques disclosed herein are "transparent" in that communications between a host controller and embedded storage device prior to implementing the disclosed techniques remain unchanged after implementing the disclosed techniques.

Some embodiments of the present disclosure are described in terms of a host device utilizing an embedded Multimedia Card (eMMC) to store DAR for the sake of enablement. However, it should be understood that the principles described herein may be applied to other scenarios involving a host device utilizing any type of embedded storage to store DAR. Examples of known embedded storage devices include a Secure Digital (SD) card, a Multimedia Card (MMC), a micro SD card, and the like.

Having briefly described an overview of embodiments of the present invention, an example of an eMMC 100 for implementing aspects of the present invention is described below with respect to FIG. 1. As discussed above, eMMC 100 is one example of a suitable integrated persistent storage device and is not intended to suggest any limitation as to the scope of use or functionality of the present invention. Neither should eMMC 100 be interpreted as having any dependency or requirement relating to any single component or combination of components illustrated therein.

Figure 1:
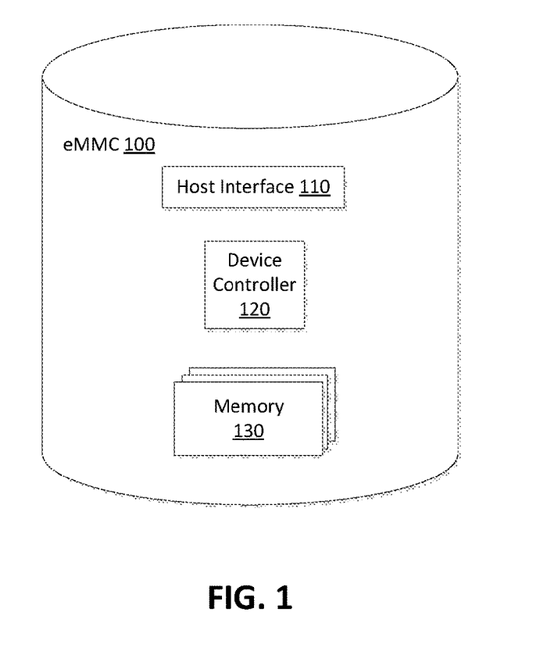
FIG. 1 depicts an example of an embedded Multi-Media Card for implementing aspects of the present invention.

With continued reference to FIG. 1, eMMC 100 is generally an integrated or embedded memory device that provides a host device with an addressable memory space (device memory space) managed by an embedded controller thereby freeing the host processor from low-level memory management functions. In an embodiment, eMMC 100 exposes a standard block interface to a host device that is compatible with a host filesystem of the host device. One skilled in the art will recognize that many functional and structural aspects of eMMC 100 are governed by various standards published by the Joint Electron Device Engineering Council (JEDEC). For example, communications between a host controller and embedded controller 120 may be governed by eMMC electrical standard 5.0 published by the JEDEC in June 2012, the contents of which are incorporated herein by reference.

As depicted in FIG. 1, eMMC 100 includes host interface 110, embedded controller 120, and a plurality of memory arrays (collectively referred to herein as memory 130). In an embodiment, host interface 110, embedded controller 120, memory 130 are packaged into a single semiconductor die. Host interface 110 communicatively couples eMMC 100 to a host controller of the host device via an internal bus structure. In an embodiment, eMMC 100, the internal bus structure, and the host controller are each physically coupled to a motherboard of the host device.

Coupled to host interface 110 in eMMC 100 is embedded controller 120 that operates as a dedicated controller that manages the device memory space provided by memory 130. Embedded controller 120 manages the device memory space by implementing a flash translation layer (FTL). Examples of memory management functions provided by the FTL include block size conversion, error correction, wear-leveling, and the like. The FTL implemented by embedded controller 120 presents a standard block interface exposing the device memory space to the host device as a logical address space addressable using logical block addresses (LBAs).

Exposing the device memory space as a logical address space to a host device provides several advantages. First, it provides the host device with a consistent view of an addressable memory space for storing retrieving data. Next, it also enables embedded controller 120 to freely manage where data is physically stored in the device memory space. Embedded controller 120 presents the host device with a consistent addressable memory space using a data structure (e.g., a page table). The data structure maps a relationship between a logical address of data as seen by the host device and a physical address representing the current physical location of data in memory 130. As such, the host device has no control on how data stored in memory 130 is managed because it only sees an emulated block storage device that hides all aspects of internal implementation.

Figure 2:
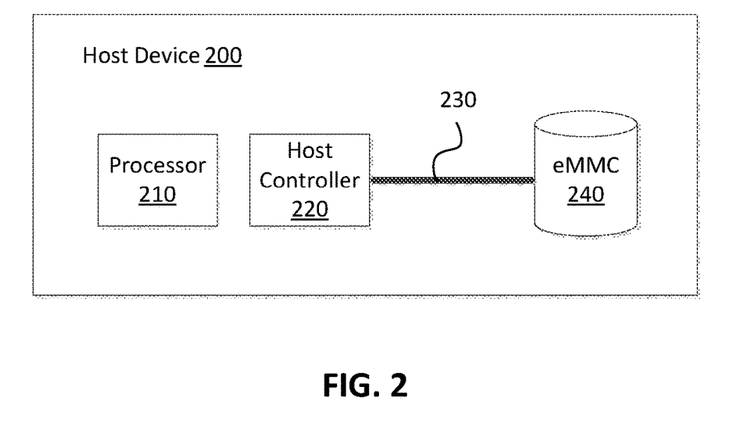
FIG. 2 depicts an example computing device for implementing aspects of the present invention.

Turning now to FIG. 2, an example schematic diagram of a computing device suitable for implementing aspects of the present invention is depicted and generally referenced as host device 200. Host device 200 can be implemented as any device capable of exchanging data with an embedded storage device. Examples of suitable devices for implementing host device 200 include a desktop computer, a laptop computer, a smartphone, a notepad computer, a point of sale terminal, a game console, an entertainment appliance, and the like.

As shown, host device 200 includes processor 210, host controller 220, internal bus structure 230, and eMMC 240. Processor 210 is configured to interpret and execute instruction sequences (e.g. an application or computer program) stored in computer-readable media with one or more threads of execution. Processor 210 is also configured to receive input data (e.g., from a user or another computing device), process that input data to produce output data. In an embodiment, processor 210 is a central processing unit (CPU).

In operation, host controller 220 initiates data transfer operations via internal bus structure 230 with eMMC 240 as directed by processor 210. Data transfer operations transfer data between a system memory space associated with processor 210 and a device memory space provided by eMMC 240. In host device 200, the system memory space is used to store data-in-use (DIU) and the device memory space is used to store DAR.

As used herein, "data-in-use" refers to computer-readable instructions currently being executed by a processor (e.g. processor 210) and any data stored in non-persistent memory that the computer-readable instructions utilize. For example, processor 210 may direct host controller 220 to initiate a write data transfer operation (write operation) that transfers DIU from a system memory space to a device memory space for non-volatile storage as DAR. In another example, processor 210 may direct host controller 220 to initiate a read data transfer operation (read operation) that transfers DAR from a device memory space to a system memory space for execution by processor 210.

Upon receiving a data transfer instruction from processor 210, host controller 220 is configured to generate a device-specific command that operates on eMMC 240. The device-specific command generated by host controller 220 includes an LBA associated with the data that references the logical address space of eMMC 240 as seen by host device 200. In an embodiment, the device-specific command generated by host controller 230 is a block-oriented command. In an embodiment, communications between host controller 220 and eMMC 240 are governed by various standards published by the JEDEC.

For example, host controller 220 may receive a read instruction from processor 210 that instructs host controller 220 to initiate a read operation with eMMC 240 to retrieve DAR stored by eMMC 240. In response, host controller 220 may generate a read command that instructs an embedded controller within eMMC 240 to retrieve the requested DAR at an LBA. Host controller 220 then communicates the read command to eMMC 240 via internal bus structure 230. Upon receiving the read command, the embedded controller within eMMC 240 (e.g., embedded controller 120 of FIG. 1) maps the LBA from the logical address space to a physical address space to locate the requested DAR. The embedded controller then retrieves the requested DAR from the physical address space location and returns it to host controller 220 via internal bus structure 230.

As another example, host controller 220 may receive a write instruction from processor 210 that instructs host controller 220 to initiate a write operation with eMMC 240 to store DIU in a device memory space of eMMC 240. In response, host controller 220 may generate a write command that instructs the embedded controller to store the DIU at a particular LBA. Host controller 220 then communicates the write command to eMMC 240 via internal bus structure 230. Upon receiving the write command, the embedded controller within eMMC 240 stores the data associated with write command in the device memory space. The embedded controller also updates its data structure to associate the physical address space location where the data is physically stored with the LBA in the write command. By updating the data structure, the embedded controller is able to subsequently retrieve that data when host controller 220 issues a read command referencing that LBA. The embedded controller then communicates a response to host controller 220 that confirms the data has been stored.

In an embodiment, internal bus structure 230 includes a bidirectional command channel adapted to transfer device-specific data transfer commands from host controller 220 to an embedded controller within eMMC 240 and responses from the embedded controller to host controller 220. In an embodiment, internal bus structure 230 includes a plurality of bidirectional data transfer channels for exchanging data between a system memory space of host device 200 to a device memory space of eMMC 240.

Figure 3:
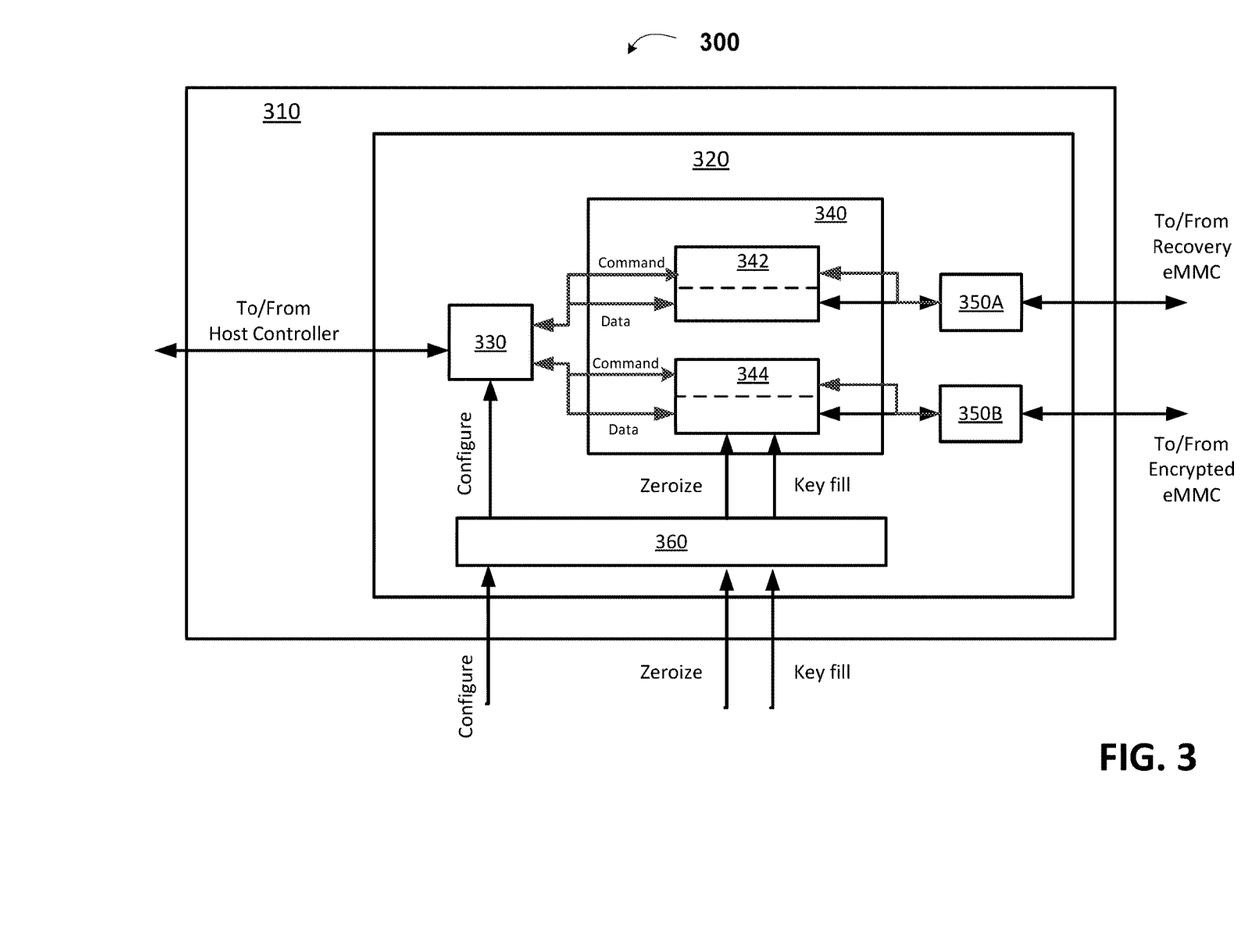
FIG. 3 depicts an example schematic diagram of an in-line encryption device in accordance with aspects of the present invention.

FIG. 3 depicts an example block diagram of an encryption device 300 for providing in-line DAR encryption in accordance with aspects of the present invention. Encryption device 300 may implement any combination of methods 500, 600, and 700 of FIGS. 5, 6, and 7, respectively. One skilled in the art can appreciate that the example elements depicted by FIG. 3 are illustrated to provide an operational framework for describing the present invention. As such, in some embodiments the physical layout of an encryption device may be different depending on different implementation schemes.

Encryption device 300 is configured to provide transparent, in-line encryption of DAR stored by a host controller of a host device (e.g., host device 200 of FIG. 2). As shown, encryption device 300 includes embedded programmable logic device (PLD) 310 representing a hardware device physically coupled to a system board within a host device. For example, embedded PLD 310 may be physically attached to a motherboard within a host device along with a processor, a host controller, and one or more integrated storage devices (e.g. eMMC 100 of FIG. 1) of the host device. In another example, embedded PLD 310 may be physically coupled to a daughter board within a host device that is interfaced with a motherboard that includes a processor, a host controller and one or more integrated storage devices of the host device.

Embedded PLD 310 can be implemented using any known hardware device capable of effectuating reconfigurable logic circuits or logic functions. Examples of suitable hardware devices for implementing embedded PLD 310 include a programmable logic array (PLA), a programmable array logic (PAL), an FPGA, a complex programmable logic device (CPLD), an erasable programmable logic device (EPLD), an application-specific integrated circuit (ASIC), a programmable logic controller (PLC), and the like.

The reconfigurable logic circuits or logic functions effectuated by embedded PLD 310 may be configured/reconfigured using a device programmer. The device programmer interfaces embedded PLD 310 to store one or more intellectual property (IP) cores in a non-volatile memory of embedded PLD 310. As known by one skilled in the art, the functionality that an IP core provides in embedded circuit design is comparable to the functionality that a library provides in computer software programming. The IP cores stored in the non-volatile memory of embedded PLD 310 effectuates defined logic circuits or particular functionalities that instantiate encryption core 320. In an embodiment, encryption core 320 is implemented using soft IP cores, hard IP cores, or a combination thereof.

Encryption core 320 includes storage device proxy 330, encryption engine 340, and a plurality of host device proxies 350 (e.g., recovery-host proxy 350A and encrypted-host proxy 350B), and security admin interface 360. Storage device proxy 330 is configured to present a standard block interface to a host controller of a host device. The standard block interface presented by storage device proxy 330 is an abstract reference to an aggregate device memory space provided by a plurality of persistent storage devices (e.g., eMMC 100 of FIG. 1). That is, the standard block interface exposes the aggregate device memory space provided the plurality of persistent storage devices to the host controller as a single persistent storage device.

The abstraction provided by storage device proxy 330 enables encryption device 300 to control how the aggregate device memory space is exposed to the host controller. For example, encryption device 300 may only expose a subset of the plurality of persistent storage devices to the host controller via storage device proxy 330. Also, encryption device 300 may only expose a subset of a particular persistent storage device's memory space to the host controller via storage device proxy 330.

The abstraction provided by storage device proxy 330 also enables encryption device 300 to control how the host controller may access the aggregate device memory space. For example, encryption device 300 may provide the host controller with read-only access to the aggregate memory device space exposed by storage device proxy 330, thereby permitting only read data transfer operations. Likewise, encryption device 300 may provide the host controller with read-write access to the aggregate memory device space exposed by storage device proxy 330, thereby permitting read and write data transfer operations. Moreover, encryption device 300 may provide the host controller with read-write access or read-only access to a subset of the plurality of persistent storage devices.

In operation, storage device proxy 330 is further configured to route data transfer commands to one host device proxy among the plurality of host device proxies 350. In an embodiment, storage device proxy 330 is configured to route data transfer commands based on an encryption state of encryption engine 340. In an embodiment, an encryption state of encryption engine 340 is determined based on one or more encryption integrity parameters. In an embodiment, the one or more encryption integrity parameters are received from a security architecture admin external to the host device via security admin interface 360. In an embodiment, storage device proxy 330 is configured to route data transfer commands based on configuration information received from the security architecture admin.

Encryption engine 340 includes null-encryption plugin 342 configured to support unencrypted persistent storage devices and encryption plugin 344 configured to support encrypted storage devices. Null-encryption plugin 342 is configured to interface storage device proxy 330 to one or more host device proxies 350 associated with unencrypted persistent storage devices. Null-encryption plugin 342 provides an encryption bypass for data transfer commands and associated data exchanged between storage device proxy 330 and the unencrypted persistent storage devices.

Encryption plugin 344 is configured to interface storage device proxy 330 to one or more host device proxies 350 associated with encrypted persistent storage devices. During data transfer operations, data associated with a data transfer command is plain text data when propagating between encryption plugin 344 and storage device proxy 330. When propagating between encryption plugin 344 and the one or more host device proxies 350 associated with encrypted persistent storage devices data associated with the data transfer command is cipher text data.

Encryption plugin 344 converts plain text data to cipher text data and vice versa during the data transfer operation by applying an encryption/decryption algorithm (encryption algorithm) to the transferred data. In an embodiment, an encryption algorithm is received from the security architecture admin via security admin interface 360. Examples of suitable encryption algorithms include Advanced Encryption Standard (AES), Blowfish, RSA, and the like. In an embodiment, a key used with the encryption algorithm is received from the security architecture admin via security admin interface 360.

Encryption plugin 344 is further configured to implement one or more actions in response to receiving a zeroize command. For example, upon receiving a zeroize command encryption plugin 344 may render an encryption algorithm unusable. As another example, encryption plugin 344 may issue a command to a host device proxy associated with an encrypted persistent storage device. In response to the command, a device controller of the encrypted persistent storage device would to render at least a portion of data stored in the device memory space unusable. Also, encryption plugin 344 may render one or more IP cores associated with encryption core 320 unusable in response to receiving a zeroize command. In an embodiment, a zeroize command is received from the security architecture admin via a network interface associated with the host device. In an embodiment, a zeroize command is issued by a process executing on a processor of the host device in response to determining one or more encryption integrity parameters have been violated.

Figure 4:
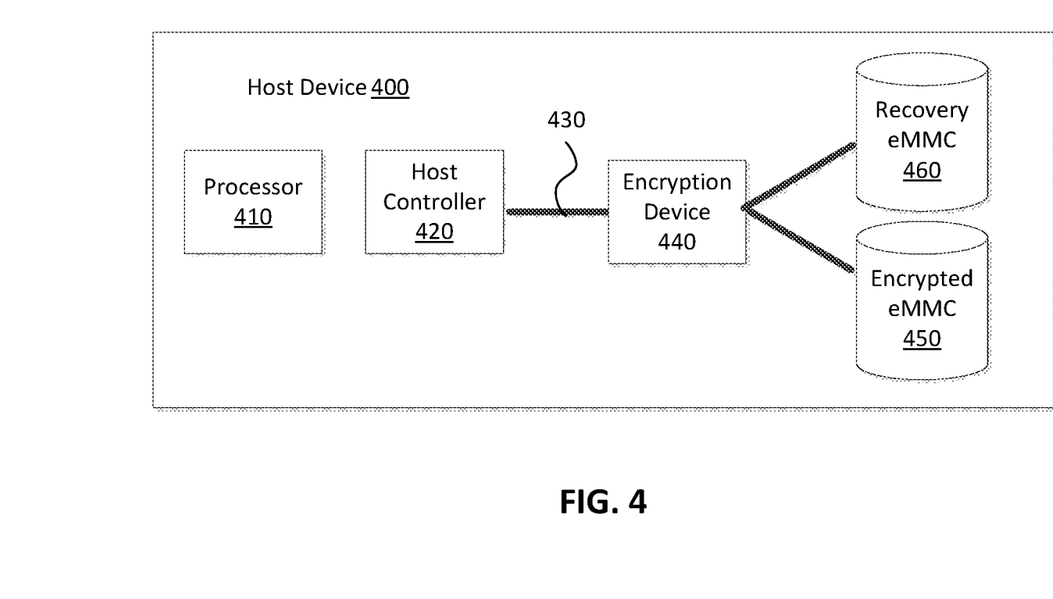
FIG. 4 depicts an example computing device in accordance with aspects of the present invention.

FIG. 4, an example schematic diagram of a computing device in accordance with aspects of the present invention is depicted and generally referenced as host device 400. In the example depicted by FIG. 4, host device 400 includes processor 410, host controller 420, and internal bus structure 430, which may be substantially similar to processor 210, host controller 220, and internal bus structure 230 of FIG. 2, respectively. Unlike host device 200, host device 400 further includes encryption device 440 that presents a standard block interface to host controller 420. As discussed above, the standard block interface provides a layer of abstraction the enables encryption device 440 to control how host controller 420 interacts with an aggregate device memory space provided by encrypted eMMC 450 and recovery eMMC 460.

For example, encryption device 440 may expose encrypted eMMC 450 to host controller 420 that provides host device 400 with non-volatile memory to store DAR. In this example, encryption device 440 may also provide host controller 420 with read-write access to encrypted eMMC 450, thereby permitting both read and write data transfer operations. As another example, encryption device 440 may expose recovery eMMC 460 to host controller 420 that provides host device 400 with non-volatile memory storing data for system recovery. In this example, encryption device 440 may also provide host controller 420 with read-only access to recovery eMMC 460, thereby permitting only read data transfer operations.

Figure 5:
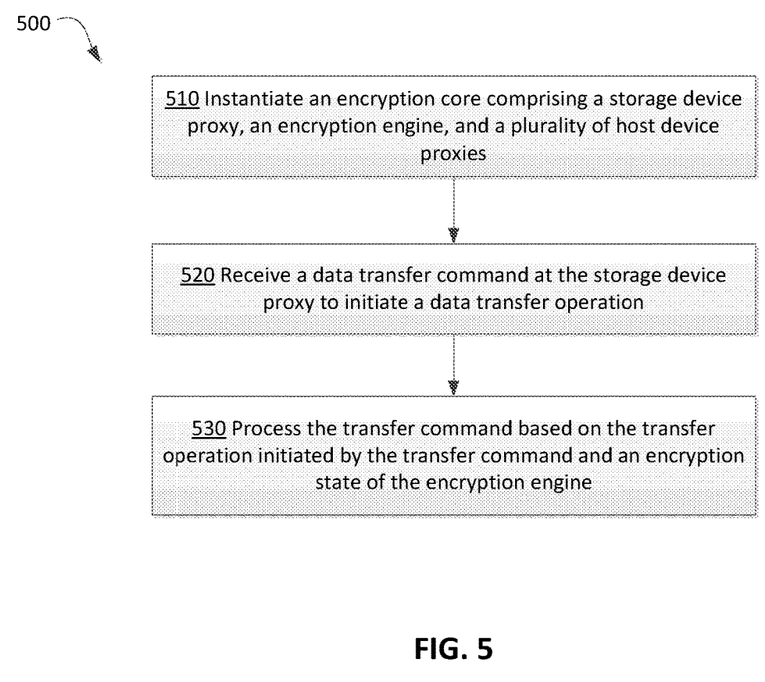
FIG. 5 depicts an embodiment of a method for providing a computing device with transparent, in-line encryption of data stored in an integrated persistent storage media.
Figure 6:
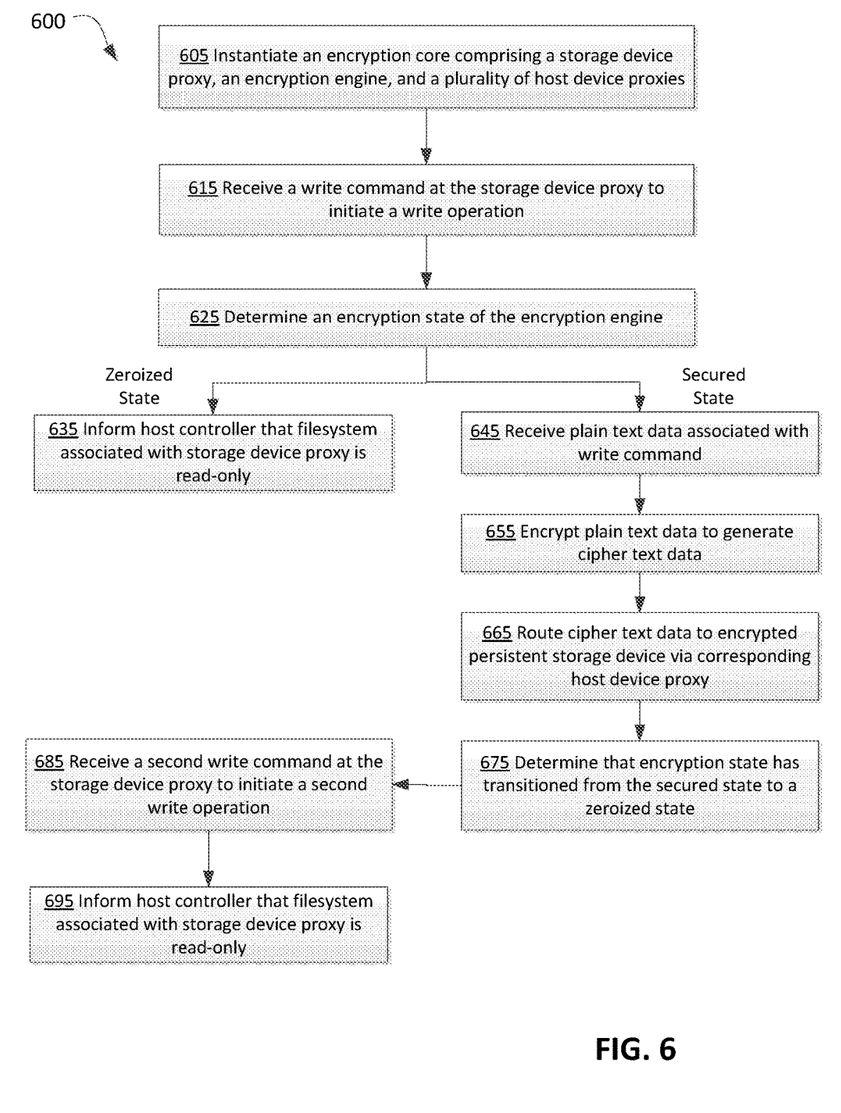
FIG. 6 depicts another embodiment of a method for providing a computing device with transparent, in-line encryption of data stored in an integrated persistent storage media.
Figure 7:
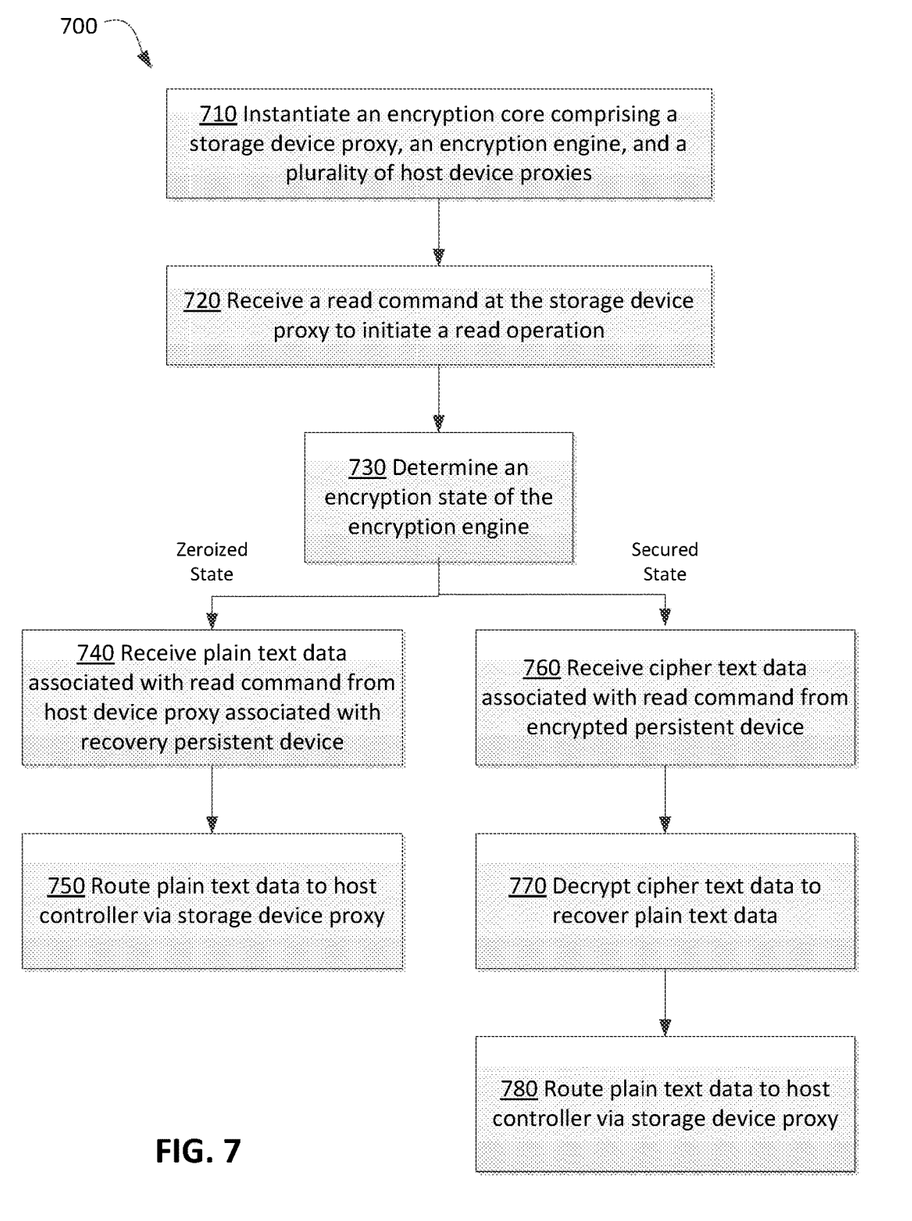
FIG. 7 depicts an embodiment of a method for providing a computing device with transparent, in-line encryption of data stored in an integrated persistent storage media.

FIGS. 5-7 depict embodiments of methods for providing a host device with transparent, in-line encryption of data stored in an integrated persistent storage device. As discussed above with respect to FIG. 3, an encryption core (e.g.

encryption core 320 of FIG. 3) may be instantiated to transform an embedded PLD within the host device into an encryption device. The encryption core comprises a storage device proxy, an encryption engine, and a plurality of host device proxies. The storage device proxy of the encryption core is configured to expose the plurality of persistent storage devices to the host controller as a single persistent storage device. Furthermore, each host device proxy among the plurality of host proxies is configured to interface its corresponding persistent storage device to the host controller via the storage device proxy.

In embodiments, one or more of the methods depicted by FIGS. 5-7 may be effectuated by encryption device 300 of FIG. 3, as it encrypts data sent by a host controller (e.g. host controller 420 of FIG. 4) to be stored on a persistent storage device (e.g. encrypted eMMC 450 of FIG. 4) and decrypts stored data retrieved by the host controller from the persistent storage device. It may be appreciated that, with respect to FIGS. 5-7, there are embodiments of the invention that do not implement all of the depicted operations, or that implement the depicted operations in a different order than is described herein.

FIG. 5 depicts an embodiment of a method 500 for providing transparent, in-line encryption of DAR stored by a host controller of a host device. In block 510, a system instantiates an encryption core comprising a storage device proxy, an encryption engine, and a plurality of host device proxies. In block 520, a storage device proxy of the encryption core receives a transfer command to initiate a data transfer operation from the host controller of the host device. In an embodiment, the transfer command is a write command to initiate a write operation. In an embodiment, the transfer command is a receive command to initiate a receive operation.

In block 530, the transfer command is processed by the system based on a data transfer operation initiated by the transfer command and an encryption state of the encryption engine. In an embodiment, the transfer command is processed by the system in part based on the encryption state of the encryption engine. For example, when the encryption engine is in a secure state the system may satisfy every data integrity parameter set by a security architecture external to the host device. In this example, the DAR encrypted by the system and the cryptographic primitives used to encrypt the DAR may not have been compromised.

In another example, when the encryption state of the encryption engine is a zeroized state the system may fail to satisfy every data integrity parameter set by the security architecture external to the host device. In this example, the DAR encrypted by the system and the cryptographic primitives used to encrypt the DAR may have been compromised.

In an embodiment, the transfer command is processed by the system in part based on the data transfer operation initiated by the transfer command. For example, the system may be exposing a persistent storage device (e.g. an encrypted storage device) to the host controller via the storage device proxy that provides the host controller with write and/or read-and-write access. In this example, the system permits the persistent storage device to implement write operations on behalf of the host device. As such, the system may route a transfer command that initiates a write operation to the persistent storage device's corresponding host device proxy.

In another example, the system may be exposing a persistent storage device (e.g. a recovery storage device) to the host controller via the storage device proxy that provides the host controller with read-only access. In this example, the system does not permit the persistent storage device to implement write operations on behalf of the host device. As such, in response to a transfer command that initiates a write operation, the system may inform the host controller via the storage device proxy that a filesystem associated with the storage device proxy is read-only. Yet, in response to a transfer command that initiates a read operation, the system may route the transfer command to the persistent storage device's corresponding host device proxy.

FIG. 6 depicts an embodiment of a method 600 for providing transparent, in-line encryption of DAR stored by a host controller of a host device. In block 605, a system instantiates an encryption core comprising a storage device proxy, an encryption engine, and a plurality of host device proxies. In block 615, a storage device proxy of the encryption core receives a write command to initiate a write operation from the host controller of the host device.

In block 625, the system determines an encryption state of the encryption engine. In an embodiment, the system determines an encryption state of the encryption engine based on one or more encryption integrity parameters set by a security architecture external to the host device. In an embodiment, the security architecture updates the one or more encryption integrity parameters in real time via a network interface of the host device.

If the system determines the encryption state is a zeroized state in block 625, method 600 proceeds to block 635. In block 635, the system informs the host controller via the storage device proxy that a filesystem associated with the storage device proxy is read-only.

If the system determines the encryption state is a secure state in block 625, method 600 proceeds to block 645. In block 645, the storage device proxy receives plain text data associated with the write command. In an embodiment, the plain text data is received from the host controller following a response message issued by the system to the host controller. In an embodiment, the plain text data is received from the host controller following a response message issued by the encryption storage device. In block 655, the plain text data is encrypted with the encryption engine to generate cipher text data. In block 665, the system routes the cipher text data to the encrypted persistent storage device via the corresponding host device proxy to store in accordance with the write command.

In block 675, the system determines that the encryption state has transitioned from the secured state to a zeroized state. In block 685, the storage device proxy receives a second write command to initiate a second write operation from the host controller of the host device. In block 695, the system informs the host controller via the storage device proxy that a filesystem associated with the storage device proxy is read-only.

FIG. 7 depicts an embodiment of a method 700 for providing a computing device with transparent, in-line encryption of data stored in an integrated persistent storage media. In block 710, a system instantiates an encryption core comprising a storage device proxy, an encryption engine, and a plurality of host device proxies. In block 720, a storage device proxy of the encryption core receives a read command to initiate a read operation from the host controller of the host device.

In block 730, the system determines an encryption state of the encryption engine. In an embodiment, the system determines an encryption state of the encryption engine based on one or more encryption integrity parameters set by a security architecture external to the host device. In an embodiment, the security architecture updates the one or more encryption integrity parameters in real time via a network interface of the host device.

If the system determines the encryption state is a zeroized state in block 730, method 700 proceeds to block 740. In block 740, the system receives plain text data associated with the read command from a host device proxy corresponding to a recovery storage device. In block 750, the plain text data is routed to the host controller via the storage device proxy.

If the system determines the encryption state is a secure state in block 730, method 700 proceeds to block 760. In block 760, the system receives cipher text data associated with the read command from a host device proxy corresponding to an encrypted storage device. In block 770, the cipher text data is decrypted with the encryption engine to recover plain text data encoded in the cipher text data. In block 780, the system routes the plain text data to the host controller via the storage device proxy.

Figure 8:
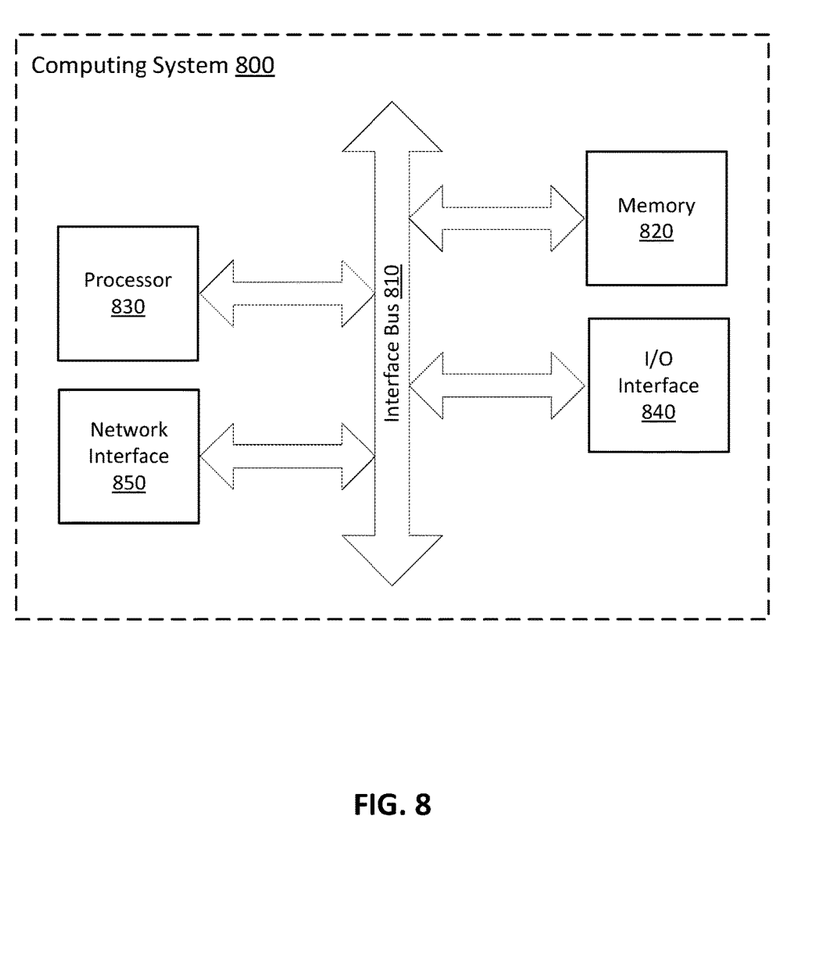
FIG. 8 is a block diagram of an example general purpose computing system in which embodiments of the invention may be implemented.

FIG. 8 is a block diagram of an example general purpose computing system 800 in which embodiments of the invention may be implemented. As depicted, computing system 800 includes bus 810 that directly or indirectly couples the following components: memory 820, one or more processors 830, I/O interface 840, and network interface 850. Bus 810 is configured to communicate, transmit, and transfer data, controls, and commands between the various components of computing system 800. One skilled in the art will recognize that bus 810 represents a network of one or more system buses interconnecting the various components of computing system 800. The one or more system busses may be any of several types of bus structures including a memory bus or memory controller, a peripheral bus, and a local bus using any of a variety of bus architectures.

Memory 820 includes a variety of computer-readable media data and/or instructions that are executable by processor 830 (i.e., processor 830 may be programmed by the instructions) to enable processor 830 to perform the functions described herein. In general, computer-readable media can be any available media that is accessible by computing system 800 and includes both volatile and nonvolatile media, removable and non-removable media. Computer-readable media may also comprise both computer-storage media and communication media. Computer-storage media does not comprise, and in fact explicitly excludes, signals per se.

Computer-storage media includes volatile and nonvolatile, removable and non-removable, tangible and non-transient media, implemented in any method or technology for storage of information such as computer-readable instructions, data structures, program modules or other data. Computer-storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing system 800.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Computing system 800 also includes processor 830 (e.g., an execution core) that exposes logical processors that execute the data and/or instructions stored in memory 820. While one processor 830 is shown in the example depicted by FIG. 8, one skilled in the art will recognize that computing system 800 may have multiple processors (e.g., multiple execution cores per processor substrate and/or multiple processor substrates each having multiple execution cores) that each receive computer-readable instructions and process them accordingly.

I/O interface 840 enables computing system 800 to communicate with different peripherals, such as a display, a keyboard, a mouse, etc. I/O interface 840 is configured to coordinate I/O traffic between memory 820, the one or more processors 830, network interface 850, and any peripherals. Network interface 850 enables computing system 800 to exchange data with other computing devices via any suitable network.

Processor 830 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example examples are not intended to limit in any way the definition and/or meaning of the term "processor."

It will be appreciated that, while various items are illustrated as being stored in memory or on storage while being used, these items or portions of them may be transferred between memory and other storage devices. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used in the description of the disclosure and the appended claims, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof. Furthermore, the terms "assets" and "computing devices," when used in this specification, may be used interchangeably.

In general, the various features and processes described above may be used independently of one another, or may be combined in different ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A system for providing transparent, in-line encryption of data-at-rest (DAR) stored by a host controller of a host device, the system comprising:
   an encryption device, disposed between the host controller and a plurality of persistent storage devices, the encryption device comprising:
   a processor; and
   a computing device that comprises a first set of instructions to be performed that when executed by the processor causes the system to:
   instantiate an encryption core comprising;
   a storage device proxy;
   an encryption engine;
   a plurality of host device proxies, each host device proxy among the plurality of host device proxies interfacing the host controller to one persistent storage device among the plurality of persistent storage devices via the storage device proxy, the storage device proxy providing an abstract reference to an aggregated memory space provided by the plurality of persistent storage devices to the host controller as a single persistent storage device; and
   a security interface, for controlling, via the storage device proxy, exposure of the aggregated device memory space to the host controller, and for controlling host controller access to the aggregated device memory space;
   receive a transfer command to initiate a data transfer operation from the host controller at the storage device proxy; and
   process the transfer command based on the data transfer operation initiated by the transfer command and an encryption state of the encryption engine determined by the security interface;
   wherein the plurality of persistent storage devices include an encrypted storage device providing memory to the host device for storing encrypted DAR and a recovery storage device providing memory storing unencrypted recovery data usable to repair system resources of the host device.

2. The system of claim 1, wherein the transfer command is routed to a host device proxy of a corresponding encrypted storage device when the transfer command is a write command and the encryption state is a secured state.

3. The system of claim 1, wherein a host device proxy of a corresponding encrypted storage device provides the host controller with read-and-write access to the encrypted storage device.

4. The system of claim 2, wherein the computing device further comprises a second set of instructions to be performed that when executed by the processor further causes the system to:
   encrypt plain text data received from the host controller via the storage device proxy with the encryption engine to generate cipher text data.

5. The system of claim 1, wherein the transfer command is routed to a host device proxy of a corresponding recovery storage device when the transfer command initiates a read operation and the encryption state is a zeroized state.

6. The system of claim 1, wherein a host device proxy of a corresponding recovery storage device provides the host controller with read-only access to the recovery storage device.

7. A method for providing transparent, in-line encryption of data-at-rest (DAR) stored by a host controller of a host device, the method comprising:
   instantiating an encryption core comprising:
      a storage device proxy;
      an encryption engine;
      a plurality of host device proxies, each host device proxy among the plurality of host device proxies interfacing the host controller to one persistent storage device among a plurality of persistent storage devices via the storage device proxy, the storage device proxy providing an abstract reference to an aggregated memory space provided by the plurality of persistent storage devices to the host controller as a single persistent storage device; and
      a security interface, for controlling, via the storage device proxy, exposure of the aggregated device memory space to the host controller, and for controlling host controller access to the aggregated device memory space;
   receiving a write command to initiate a write operation from the host controller at the storage device proxy;
   determining an encryption state of the encryption engine; and
   processing the write command based on the encryption state determined by the security interface;
   wherein the plurality of persistent storage devices include an encrypted storage device providing memory to the host device for storing encrypted DAR and a recovery storage device providing memory storing unencrypted recovery data usable to repair system resources of the host device.

8. The method of claim 7, wherein processing the write command includes routing the write command to the encrypted storage device via the corresponding host device proxy when the encryption state is a secured state.

9. The method of claim 8, further comprising:
   receiving plain text data associated with the write command at the storage device proxy; encrypting the plain text data with the encryption engine to generate cipher text data; and routing the cipher text data to the encrypted storage device via the corresponding host device proxy to store in accordance with the write command.

10. The method of claim 8, further comprising:
    determining the encryption state transitioned from the secured state to a zeroized state; receiving a second write command to initiate a second write operation from the host controller at the storage device proxy subsequent to determining the encryption state transitioned to the zeroized state; and
    in response to the second write command, informing the host controller via the storage device proxy that a filesystem associated with the storage device proxy is read-only.

11. The method of claim 7, wherein the encryption state of the encryption engine is determined based on one or more encryption integrity parameters set by a security architecture external to the host device.

12. The method of claim 7, further comprising:
    receiving a zeroize command at the encryption engine; and
    in response to receiving the zeroize command, rendering an encryption algorithm associated with the encryption engine unusable and directing an embedded controller of the encrypted storage device to render at least a portion of data stored in the memory of the encrypted storage device unusable.

13. The method of claim 12, wherein the zeroize command is initiated by a computing device external to the host device.

14. The method of claim 7, wherein processing the write command includes informing the host controller via the storage device proxy that a filesystem associated with the storage device proxy is read-only when the encryption state is a zeroized state.

15. The method of claim 7, wherein the encryption engine receives encryption keys from a source external to the host device.

16. A system for providing transparent, in-line encryption of data-at-rest (DAR) stored by a host controller of a host device, the system comprising:
    an encryption device, disposed between the host controller and a plurality of persistent storage devices, the encryption device comprising:
       a processor; and
       a computing device that comprises a first set of instructions to be performed that when executed by the processor causes the system to at least:
          instantiate an encryption core comprising:
             a storage device proxy;
             an encryption engine having access to at least one encryption key;
             a plurality of host device proxies, each host device proxy among the plurality of host device proxies interfacing the host controller to one persistent storage device among the plurality of persistent storage devices via the storage device proxy, the storage device proxy providing an abstract reference to an aggregated memory space provided by the plurality of persistent storage devices to the host controller as a single persistent storage device; and
             a security interface, for controlling, via the storage device proxy, exposure of the aggregated device memory space to the host controller, and for controlling host controller access to the aggregated device memory space;
          receive a read command to initiate a read operation from the host controller at the storage device proxy,
          determine an encryption state of the encryption engine; and process the read command is based on the encryption state determined by the security interface;
          wherein the plurality of persistent storage devices include an encrypted storage device providing memory to the host device for storing encrypted DAR and a recovery storage device providing memory storing unencrypted recovery data usable to repair system resources of the host device.

17. The system of claim 16, wherein the computing device further comprises a second set of instructions to be performed that when executed by the processor further causes the system to:
    route the read command to the encrypted storage device via the corresponding host device proxy when the encryption state is a secured state; and in response to the read command, receive cipher text data associated with the read command from the encrypted storage device.

18. The system of claim 17, wherein the computing device further comprises a third set of instructions to be performed that when executed by the processor further causes the system to:

decrypt the cipher text data with the encryption engine to recover plain text data encoded within the cipher text data; and route the plain text data to the host device via the storage device proxy.

19. The system of claim 16, wherein the computing device further comprises a second set of instructions to be performed that when executed by the processor further causes the system to:

route the read command to the recovery storage device via the corresponding host device proxy when the encryption state is a zeroized state; and in response to the read command, receive unencrypted recovery data associated with the read command from the recovery storage device.

20. The system of claim 19, wherein at least one persistent storage device among the plurality of persistent storage devices is an embedded multimedia card.

* * * * *